United States Patent [19]
Moriyama

[11] Patent Number: 5,232,280
[45] Date of Patent: Aug. 3, 1993

[54] TWIN CONICAL SCREW EXTRUDER PROVIDED WITH PRESSURIZING MEMBERS

[76] Inventor: Masao Moriyama, 13-508, Tendocho 17, Nishinomiya, Hyogo 663, Japan

[21] Appl. No.: 747,644

[22] Filed: Aug. 20, 1991

[30] Foreign Application Priority Data

Aug. 22, 1990 [JP] Japan .................................. 2-222260
Aug. 22, 1990 [JP] Japan .................................. 2-222261

[51] Int. Cl.$^5$ ............................ B29B 7/20; B01F 7/08
[52] U.S. Cl. ........................................ 366/83; 366/89; 425/204
[58] Field of Search ....................... 366/69, 76, 77, 79, 366/83, 96-99, 84, 85, 89, 292, 297, 300, 301, 318; 425/204, 208, 209, 366, 376.1; 264/211.21, 211.23; 74/665 H

[56] References Cited

U.S. PATENT DOCUMENTS

| | | |
|---|---|---|
| 2,466,934 | 4/1949 | Dellenbarger ............... 74/665 H X |
| 3,138,825 | 6/1964 | Colombo ............................ 425/204 |
| 4,047,705 | 9/1977 | Hanslik ................................ 366/85 |
| 4,408,888 | 10/1983 | Hanslik ............................ 366/89 X |
| 4,764,020 | 8/1988 | Moriyama ............................ 366/76 |
| 4,773,763 | 9/1988 | Weber ............................ 366/85 X |

FOREIGN PATENT DOCUMENTS

| | | | |
|---|---|---|---|
| 2446420 | 4/1976 | Fed. Rep. of Germany ........ 366/79 |
| 2748918 | 5/1979 | Fed. Rep. of Germany ...... 425/204 |
| 3420918 | 12/1985 | Fed. Rep. of Germany ...... 366/196 |
| 0036425 | 3/1983 | Japan ................................ 425/204 |
| 0154030 | 8/1985 | Japan ................................ 425/204 |
| 60-240430 | 11/1985 | Japan ................................ 425/204 |
| 444470 | 3/1968 | Switzerland ........................ 425/204 |
| 1595965 | 8/1981 | United Kingdom ................ 425/209 |

*Primary Examiner*—Harvey C. Hornsby
*Assistant Examiner*—Charles Cooley
*Attorney, Agent, or Firm*—Koda and Androlia

[57] ABSTRACT

A twin conical screw extruder which includes a twin conical container having a material inlet port, a material extruding port on the opposite side of the material inlet port, and an inner conical wall surface converging toward the material extruding port, a pair of conical screw rotors accommodated in the twin conical container, each of the conical screw rotors having a free end adjacent to the material extruding port and a base portion rotatably supported such that the screws of the two rotors intermeshingly rotated in two different directions and a pressurizing device provided in each free end of the screw rotors so as to forcibly keep the free ends of the screw rotors in contact with each other at a predetermined contact pressure so as to overcome a pressure arising from the extruding operation.

2 Claims, 7 Drawing Sheets

TWIN CONICAL SCREW EXTRUDER PROVIDED WITH PRESSURIZING MEMBERS

BACKGROUND OF THE INVENTION

The present invention relates to a twin conical screw extruder for extruding a highly viscous material such as plastics, rubber or the like.

In the twin conical screw extruder, the container is generally reduced in section area in the direction toward the tips of the rotors. Accordingly, the internal pressure is increased in inverse proportion to such reduction. This is advantageous in that a strong extruding force is obtained for the rotor lengths.

The inventor of the present invention had proposed an extruder utilizing the advantage above-mentioned, which was allowed as U.S. Pat. No. 4,764,020.

In a conventional twin conical screw extruder including the prior art above-mentioned, the axes of bearings which support the base portions of two rotors, are naturally identical with the axes of the twin conical container which houses the rotors. Accordingly, the angle $\alpha$ formed by the axes of the bearings is equala to the angle $\alpha$ formed by the axes of the twin conical container. At a non-load state where the container is not filled with a material to be extruded, the rotor shafts are straight and do not interfere with each other even though the screw mountain portions are meshed with each other, so that gaps are formed between the rotors.

In the prior art, when the rotors are rotated with the screws meshed with each other, the internal pressure applied to the material becomes the highest in the vicinity of the points at which the screws are meshed with each other, i.e., the plane between and including the axes of the rotors. Further, the internal pressure is increased in the direction toward the tips of the rotors. Accordingly, the tips of the twin rotors are pushingly turned outwardly. Thus, at the time when a load is applied, the rotor shafts are so resiliently deformed as to be outwardly turned.

Taking such resilient deformation of the rotors into consideration, there have been determined that gaps exist between the container inner wall surface and the locus faces of rotation of the rotor mountain portions. Accordingly, such gaps are naturally made great. Further, since the resilient deformation of the rotors causes the gaps between the screw meshing points to be increased, the material filled in the gaps sticks to the rotors as they are rotated and is therefore not conducive to an extruding force. Thus, the performance of the extruder at the screw meshing portions is deteriorated. In this connection, there occurs a phenomenon that the increase in the pressure at the material extruding port is not proportional to the rotor drive force, but is weaken or saturated. This is more remarkable as the material viscosity is higher.

In the conventional twin conical screw extruder, each of the mountain portions of the screws of the rotors is made in the form of a trapezoid and the mountain portions of one screw are meshed, as fully embedded in, with the valley portions of the other screw.

With the screw arrangement above-mentioned, when there is extruded a highly viscous material of which frictional resistance is high at the interface with the screws, or when the rotor drive force is increased in order to increase the pushing force at the tip extruding port, the resistance force for pushing the material back from the rotor tips is also increased. Accordingly, the increment of the pushing force at the tip extruding port with respect to the increment of the rotor drive force is suddenly decreased and then saturated.

OBJECTS OF THE INVENTION

It is an object of the present invention to provide an extruder in which, even though the viscosity of a material to be extruded is high or the extruding amount of the material is increased to increase the internal pressure so that the rotor shafts are resiliently deformed, the rotor shafts do not interfere with the inner wall of the container, thus minimize the gaps between the rotor shafts and the container inner wall surface, so that the upper limit of the extruding force is increased.

DISCLOSURE OF THE INVENTION

The twin conical screw extruder in accordance with the present invention comprises no-load pressurizing means arranged such that the rotor tips are pushed to and by each other at a predetermined force at a state where no load is applied to the conical rotors.

The term of "state where no load is applied" refers to the state where a material to be extruded is not present in the extruder container and the internal pressure applied by the material is zero.

According to the present invention, the no-load pressurizing means preferably comprises tip pressurizing members fitted to the tips of the shafts of the conical rotors in such a manner as to be adjusted in the positions thereof in the axial directions of the rotor shafts, and adjusting and setting devices of the tip pressurizing members According to the present invention, the no-load pressurizing means is preferably formed by means for adjusting the angle formed by the axes of the bearings which support the twin rotors, the means being arranged such that, after the extruder is assembled such that no pushing force is applied to the twin rotors, the angle formed by the axes of the bearings is increased and adjusted such that a predetermined pushing force is applied to the twin rotors.

Preferably, conical annular portions are disposed at the rotor shafts, preferably at the tips thereof, as portions on which the pushing force by the rotors is centered.

Preferably, the conical annular portions are remobably disposed at the tip ends of the rotors.

According to the present invention, each of the screws is formed such that each mountain portion is made substantially in .the form of a trapezoid comprising: a tapering valley bottom face; a front wall face which stands from the round rear end portion of the tapering valley bottom face and which is substantially at a right angle to the tapering valley bottom face; a top face rearwardly extending from the top of the front wall face; and a rear inclined face which is gradually inclined downwardly from the rear edge of the top face toward the next rearward tapering valley bottom face. In the arrangement above-mentioned, the engagement relationship between the twin rotors on the plane including two axes thereof is such that the front edge of each valley bottom face of one rotor screw approaches most closely to the top of each front wall face of the other rotor screw.

DETAILED DESCRIPTION OF THE PREFERRED EMBODIMENTS

Figure 1:
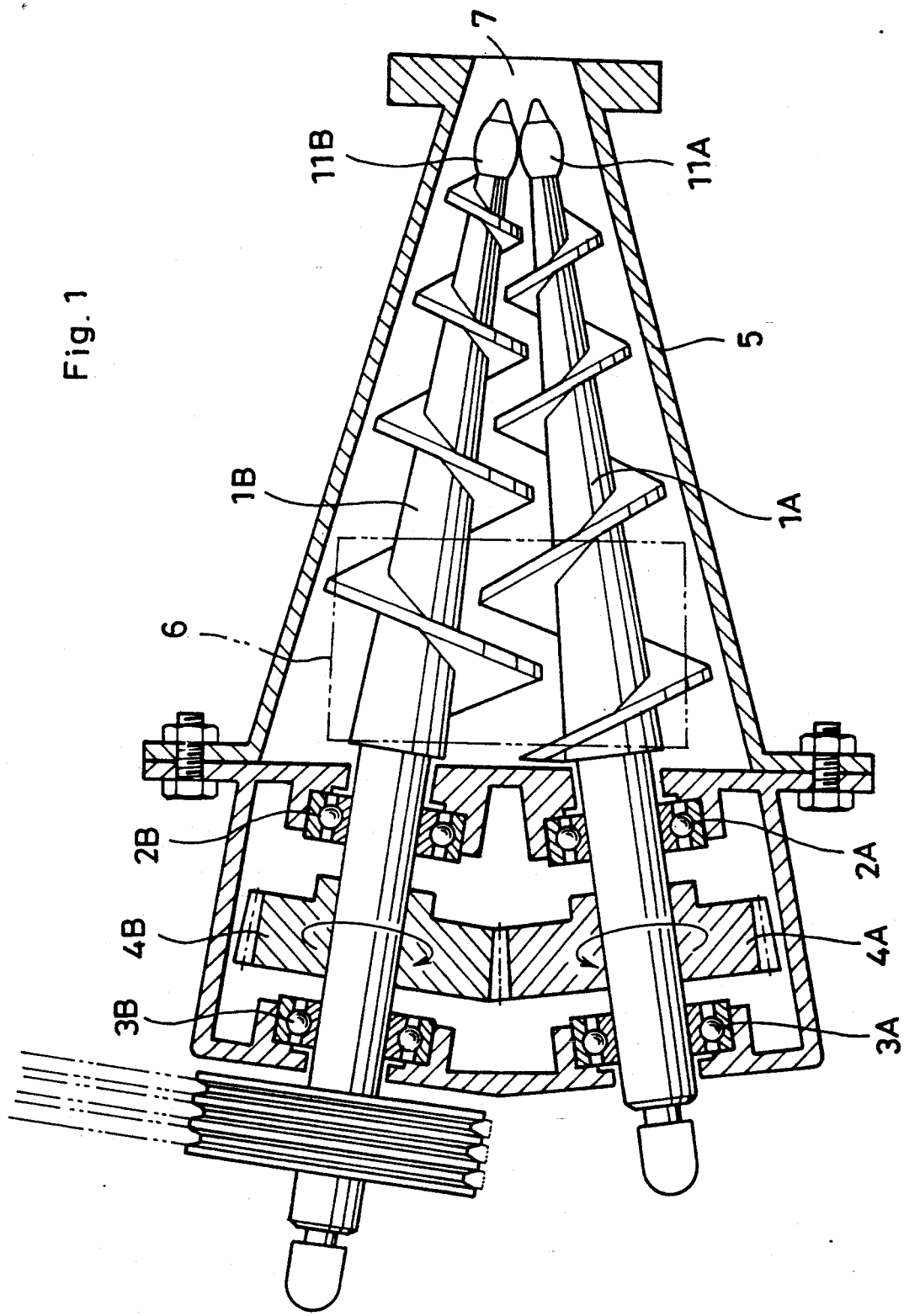
FIG. 1 is a plan view, with portions shown in section, of an extruder in accordance with an embodiment of the present invention.
Figure 2:
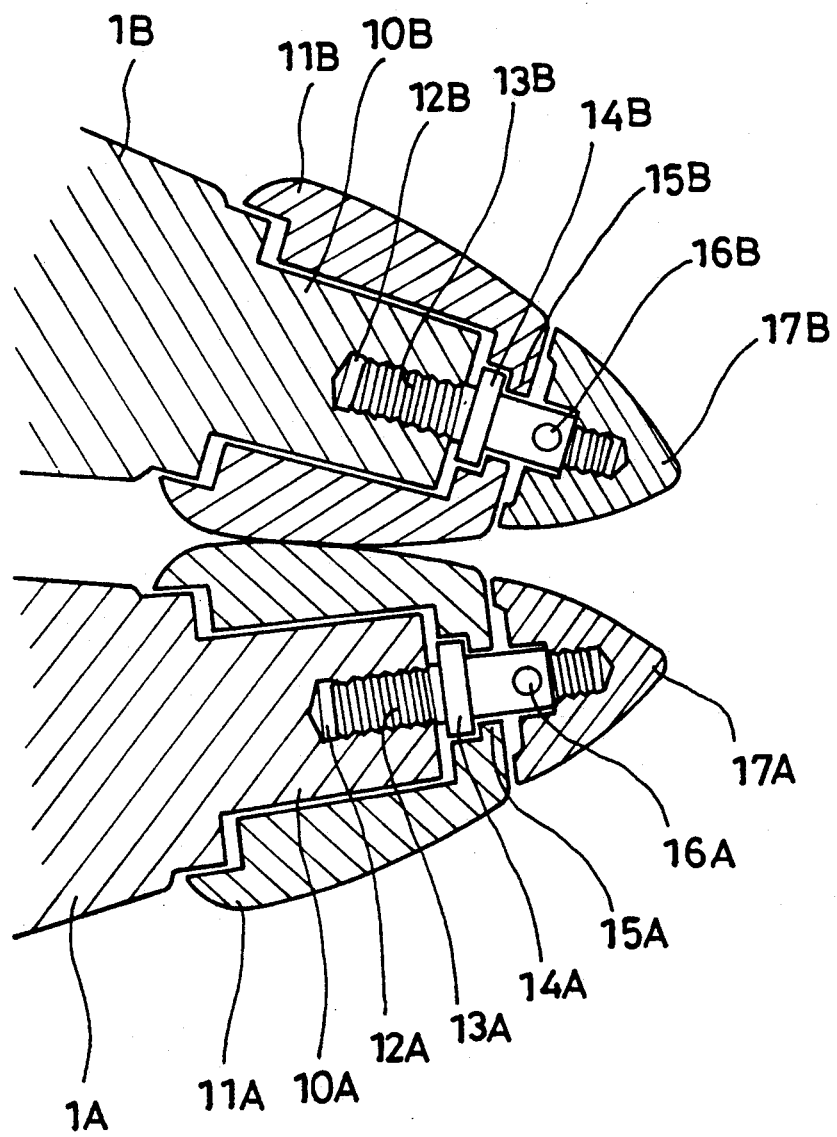
FIG. 2 is an enlarged section view of the tip portions of rotor shafts shown in FIG. 1.

The following description will discuss an embodiment of the present invention with reference to FIGS. 1 and 2.

Twin conical rotors 1A, 1B are to be rotated with screws thereof meshed with each other. The conical rotors 1A, 1B are supported at the base portions thereof by bearings 2A, 3A and 2B, 3B, respectively, and have free ends at the tips thereof. The conical rotors 1A, 1B are engaged at gears 4A, 4B with each other and driven to be rotated in different directions. A container 5 comprises (i) an inner surface in the vicinity of a twin circular cone which constitutes the locus of rotation of the mountain portions of the screws of the conical rotors 1A, 1B, (ii) a material inlet port 6 disposed on the base portion of the twin circular cone and (iii) a material extruding port 7 at the tip of the container 5. The container 5 is secured to a base stand such that the material extruding port 7 is downwardly inclined.

As shown in FIG. 2, the rotor shafts 1A, 1B are respectively provided at the tips thereof with column portions 10A, 10B and tip pressurizing members 11A, 11B axially movably fitted to the column portions 10A, 10B, respectively. Each of the pressurizing members 11A, 11B has an outer surface which is generally in the form of a circular cone but more specifically in the form of a barrel with the center portion swelling out roundly with respect to both ends. Internal screw threads 12A, 12B are respectively formed at the tip surfaces of the conical rotors 1A, 1B along the axes thereof, and engaged with flanged bolts 13A, 13B. The pressurizing members 11A, 11B are respectively provided at the tips thereof with flange receiving portions 15A, 15B which are to receive flange portions 14A, 14B of the flanged bolts 13A, 13B, the flange receiving portions 15A, 15B being formed integrally with the pressurizing members 11A, 11B. The flanged bolts 13A, 13B respectively project from the tip surfaces of the pressurizing members 11A, 11B. The flanged bolts 13A, 13B are respectively provided in projecting portions thereof with through-holes 16A, 16B to be used for rotatingly driving the bolts. Conical rotor caps 17A, 17B are respectively attached to the external threads at the tips of the bolts.

The following description will discuss how to assemble the members above-mentioned The flanged bolts 13A, 13B and the pressurizing members 11A, 11B are temporarily secured at the base side, and the flanged bolts 13A, 13B are displaced to the tip side with drive rods passed through the through-holes 16A, 16B. Then, the rotor tips are turned to the outside, so that the rotor shafts are resiliently deformed and the pushing force by and between the rotor shafts is gradually increased. When the pushing force reaches a predetermined value, the rotor caps 17A, 17B are attached to complete the adjustment.

When the conical rotors 1A, 1B are rotatingly driven, the rotors shafts come in contact with each other only at the contact point between the pressurizing members 11A, 11B, thus assuring gaps between the mountain portions and the valley portions of the screws. As the internal pressure in the container is increased after a material to be extruded is supplied into the container, force apt to turn the rotor shaft tips to the outside is increased and the pushing force by and between the pressurizing members 11A, 11B is decreased. However, even at the time when the internal pressure reaches a maximum value, the pushing force by and between the pressurizing members 11A, 11B is slightly positive. This prevents the rotor shaft tips from being outwardly turned.

Figure 5:
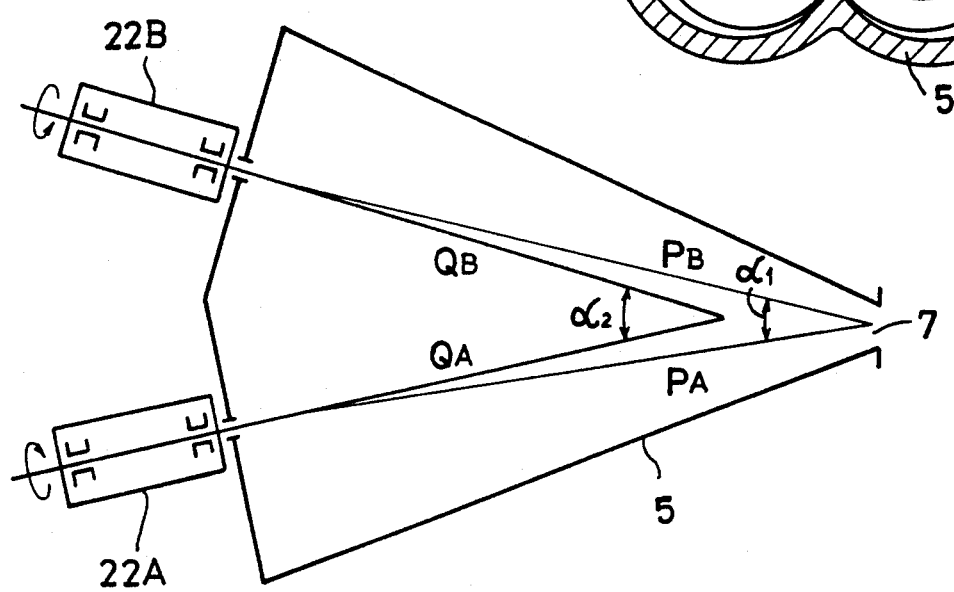
FIG. 5 is a view for explaining the embodiment shown in FIG. 3.
Figure 6:
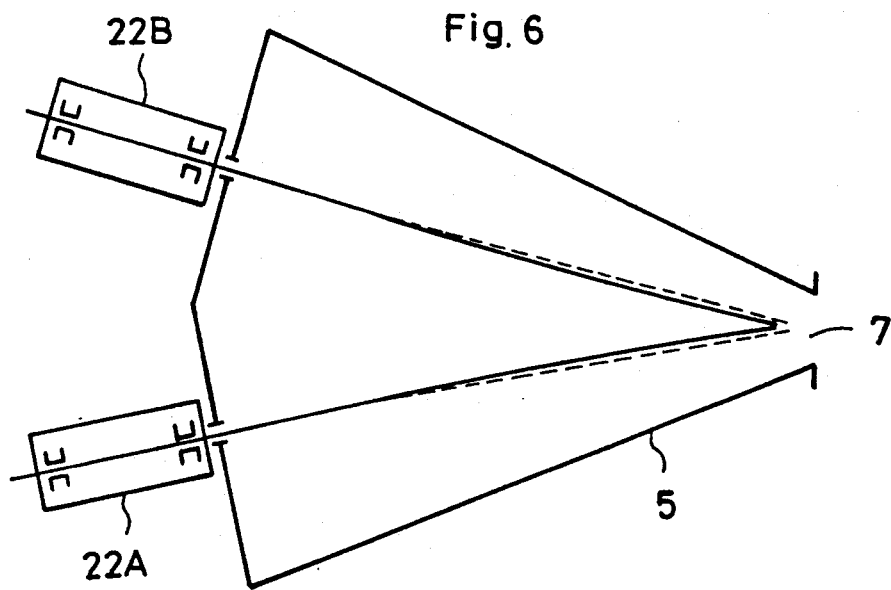
FIG. 6 is a view for illustrating the operation of the extruder in accordance with the present invention.

In FIG. 6, solid lines show a state where, with no load applied, the rotor tips are pushed to and by each other in the strongest manner so that the rotor shafts are flexed to a maximum due to resilient deformation. Doted lines in FIG. 6 diagrammatically shows a state where the axes of the rotor shaft 1A and 1B are subjected to an outward force in accordance with the internal pressure which increases from the state of no load where no material is introduced into the container. FIGS. 5 and 6 diagrammatically show the manner in which the axes of the rotor shafts 1A and 1B are displaced by changes in the pressure acting thereon, wherein the diameters of the rotors are neglected for explanation purposes.

Figure 3:
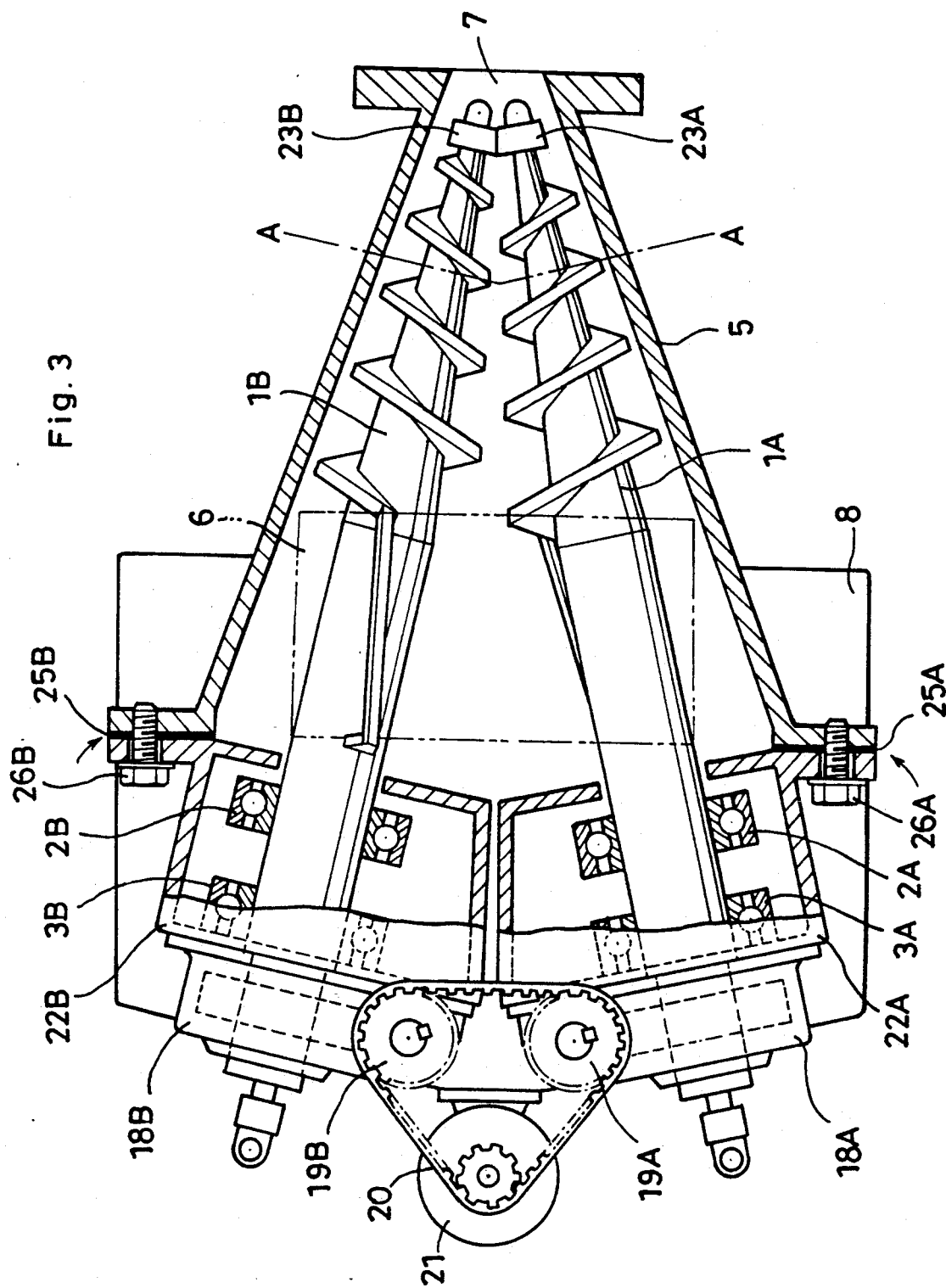
FIG. 3 is a plan view, with portions shown in section, of an extruder in accordance with another embodiment of the present invention.
Figure 4:
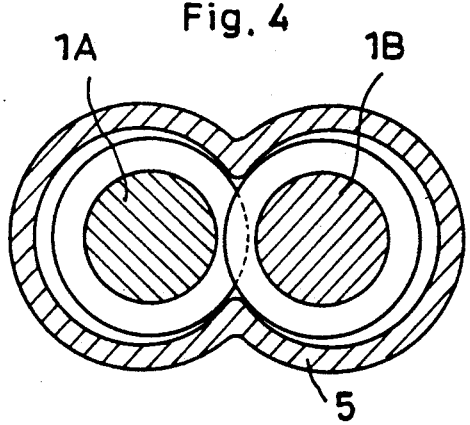
FIG. 4 is a section view taken along the line A—A in FIG. 3.
Figure 7:
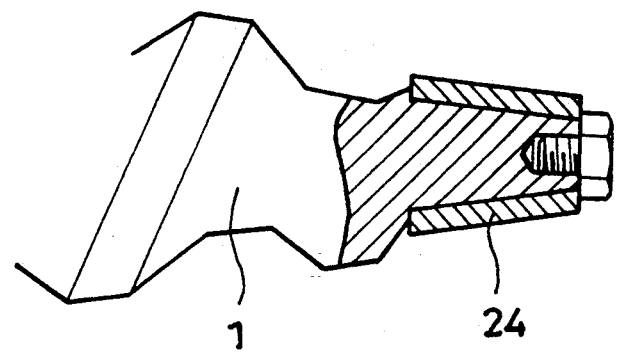
FIG. 7 is a section view of an example of a conical annular portion of the extruder in accordance with the present invention.

The following description will discuss another embodiment of the present invention with reference to FIGS. 3, 4 and 7.

This embodiment differs from the embodiment shown in FIGS. 1 and 2 in the following points.

The conical rotors 1A, 1B respectively have worm speed reduction mechanisms 18A, 18B in which follower pulleys 19A, 19B engaged with the worm shafts are driven by a motor 21 through a timing belt 20. A bearing box 22A housing bearings 2A, 3A and a bearing box 22B housing bearings 2B, 3B are independent from each other and are adapted to be angularly adjusted as rotated even at a very fine angle with respect to the container 5 of the extruder. In this connection, packings 25A, 25B, excellent in resiliency, are disposed between flanges which connect the container 5 and the respective bearing boxes 22A, 22B to each other. By fastening bolts 26A, 26B, the angle formed by the axes of the bearings is increased and a pushing force by and between the rotor shaft tips is increased. The bearing boxes 22A, 22B are so resiliently supported by the base member as to be rotated by a very fine angle with axes of the follower pulleys 19A, 19B serving as fulcrum points.

The rotor shafts 1A, 1B are respectively provided at the tips thereof with conical annular members 23A, 23B of which diameters are equal to or slightly greater than the effective diameters of the screws. The conical annular members 23A, 23B may be removably formed so that, when worn, the members 23A, 23B are replaced with new ones. In this connection, provision may be made such that only sleeve-like members 24 fitted to the outer peripheral portions of the annular members 23A, 23B are replaced.

In installation of the extruder having the arrangement above-mentioned, the extruder is assembled such that the shafts of the rotors 1A, 1B are straight with no pushing force applied at the tips of the rotors 1A, 1B. Then, the bolts 26A, 26B are fastened to rotate the bearing boxes 22A, 22B by a very fine angle in the directions shown by arrows. At this time, the rotors 1A, 1B are flexed due to resilient deformation as shown by the solid lines in FIG. 6, thus producing a strong pushing force between the tips of the rotors 1A, 1B. In other words, the axes $P_A$, $P_B$ of the twin circular cone of the container 5 are not identical with the axes of the bearings $Q_A$, $Q_B$ and the angle $\alpha 1$ formed by the two axes $P_A$ and $P_B$ is smaller than the angle $\alpha 2$ formed by the axes $Q_A$ and $Q_B$, as shown in FIG. 5.

Figure 8:
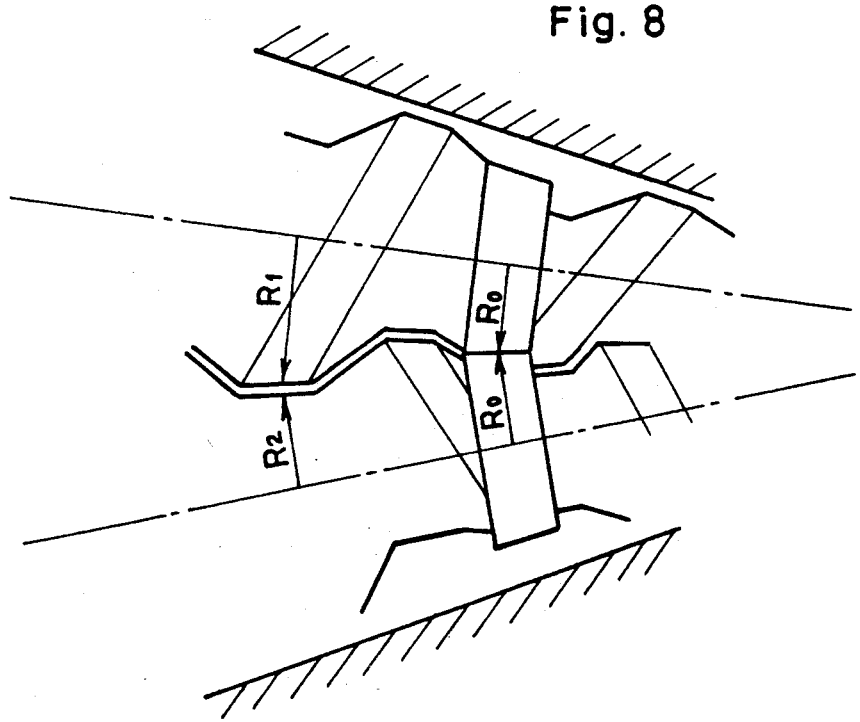
FIG. 8 is a view of another example of the conical annular portion, illustrating the operation thereof.

The following description will discuss the function of the conical annular portions. As shown in FIG. 8, the mountain-portion diameter $R_1$ is greater than the valley-portion diameter $R_2$ on the plane where the screws are meshed with each other and the axes of both rotors are connected to each other. Accordingly, it is a matter of course that the peripheral speed at the mountain side is faster than the peripheral speed at the valley side. When metals respectively having different peripheral speeds come in contact with each other, there occurs a phenomenon called "scoring". When the two rotors have portions of which diameters $R_0$ are equal to each other, such portions present the same peripheral speed to prevent the occurrence of "scoring". The diameter $R_0$ is equal to or slightly greater than the effective diameter. When the conical annular portions have diameters slightly greater than the effective diameter, the pushing force is concentrated on the annular portions to assure gaps between the screws.

According to the present invention, the conical annular portions may be disposed not only at the rotor tips as shown in FIG. 7, but also at intermediate portions of the rotors as shown in FIG. 8.

Each of the outer peripheral surfaces of the conical annular portions or conical annular members may be made, for example, in the form of a barrel as shown in FIG. 2 (such surfaces are subjected to crowning). In this case, when such annular portions or members are adjusted in position in the axial directions of the rotor shafts, each effective diameter at the pushing point can be changed to adjust the pilot pressure and the contact between the annular portions or members is expanded from a point contact to a face contact due to resilient deformation of the rotor shafts. Accordingly, the pressure exerted to the contact portions is dispersed to improve the durability.

When the conical annular members (including the tip pressurizing members) are formed in a removable manner, only such members may be replaced with new ones to renew the extruder to the initial state at the time of assembling with the wear of the container or screws substantially eliminated.

According to the present invention, the means for adjusting the angle formed by the axes of the bearings may be arranged such that only one rotor is adjusted with the other rotor secured to the base stand together with the container. Alternately, when the power transmission mechanism between both rotors is formed by bevel wheels, the base portion of the rotor shafts may be rotated with the mesh point of the bevel wheels serving as a fulcrum point. Further, when there are disposed bearing boxes which can be independently displaced as shown in FIG. 3, self-aligning rolling bearings may be used as the bearings and the rotors may be rotated around the rolling bearings.

The following description will discuss the shapes of the mountain portions of the screws in the twin conical extruder in accordance with the present invention.

Figure 9:
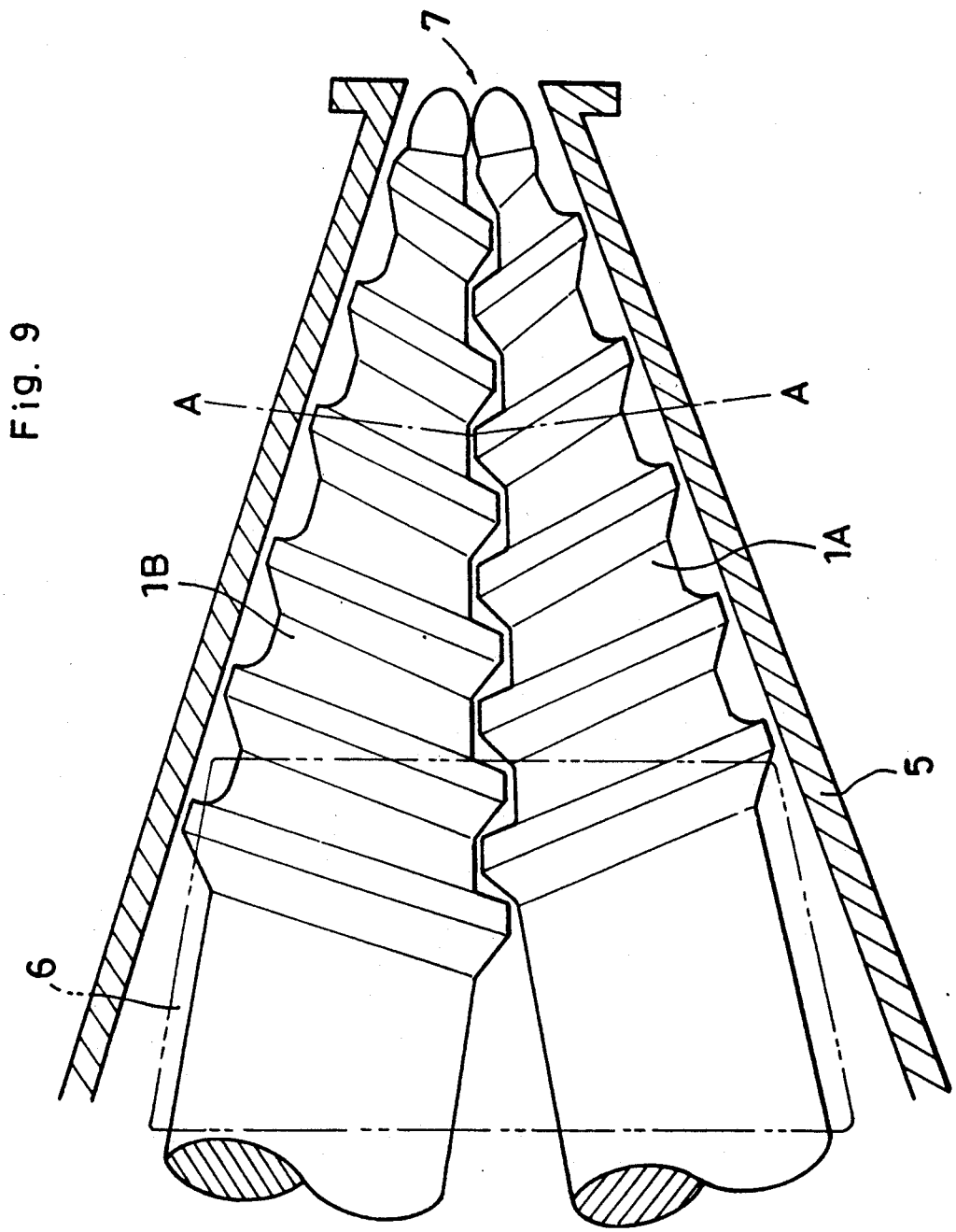
FIG. 9 is a plan view, with portions shown in section, of an example of the mountain portions of the screws in the extruder in accordance with the present invention.
Figure 10:
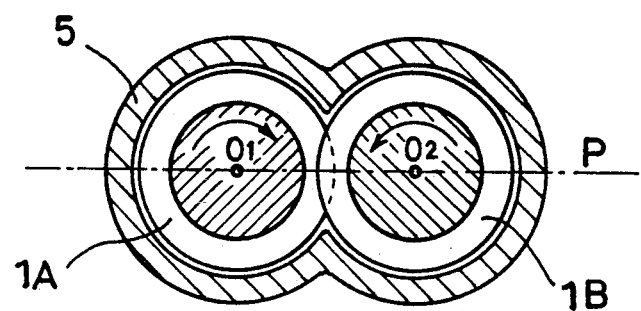
FIG. 10 is a section view taken along the line A—A in FIG. 9.
Figure 11:
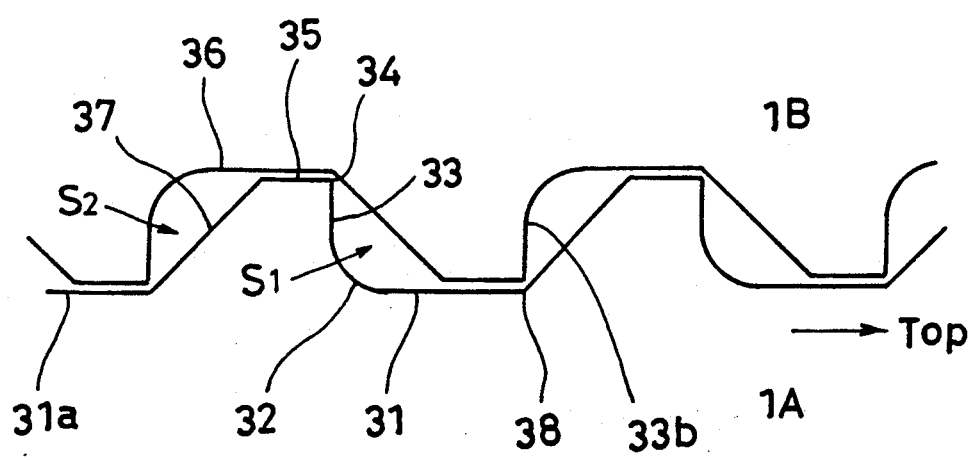
FIG. 11 is an enlarged view in side elevation of the rotors along a plane P including the respective axes $O_1$ and $O_2$ of the rotors in FIG. 10.

FIG. 9 is a general plan view of the screws, while FIG. 10 is a section view taken along the line A—A in FIG. 9. FIG. 11 is an enlarged view in side elevation of the screws along the plane P in FIG. 10 with hatching omitted.

Each of the mountain portions of the screws is made substantially in the form of a trapezoid comprising: a tapering valley bottom face 31 located in the same plane as the plane defined by the rotation locus of a valley portion; a front wall face 33 which stands from the round rear end portion 32 of the tapering valley bottom face 31 and which is substantially at a right angle to the tapering valley bottom face 31; a top face 35 rearwardly extending from the top 34 of the front wall face 33; and a rear inclined face 37 which is gradually linearly inclined downwardly from the rear edge 36 of the top face 35 toward a tapering valley bottom face 31a which is rearwardly located by one pitch with respect to the tapering valley bottom face 31. The engagement relationship between the rotors 1A, 1B on the plane P including two axes $O_1$, $O_2$ shown in FIG. 10 is such that, as shown in FIG. 11, the front edge 38 of each valley bottom face of the screw of one rotor 1A approaches most closely to the top of each front wall face 33b of the screw of the other rotor 1B.

In this embodiment, the screw pitch is equal to 50 mm, the axial length of the top face 35 is equal to 10 mm, and the axial length of the rear inclined face 37 is equal to 15 mm.

According to the present invention, the front wall faces of the screws are adapted to push out a material strongly and the rear inclined faces thereof are adapted to separate the material from the rotors to decrease the frictional resistance at the interfaces between the rotors and the material, thereby to increase the material extruding force. Further, as shown in FIG. 11, when the rotors are meshed with each other, there are still formed suitable spaced $S_1$, $S_2$ in which the material remains. This prevents the internal pressure from being excessively increased to turn the rotor shafts outwardly, even at the rotor tip portions where the internal pressure is increased. This reduces the risk that the rotor free ends interfere with the inner wall surface of the container.

What is claimed is:

1. A twin conical screw extruder comprising:
   a twin conical container having a material inlet port, a material extruding port on an opposite side of the material inlet port, and an inner conical wall surface converging toward the material extruding port;

a pair of conical screw rotors accommodated in the twin conical container, each of the conical screw rotors having a free end adjacent to the material extruding port and a base portion rotataby supported such that the screws of the two conical screw rotors are intermeshed and rotated in different directions; and pressurizing means provided in each free end of the conical screw rotors for forcibly keeping the free ends of the conical screw rotors in contact with each other at a predetermined contact pressure so as to overcome a pressure arising from the extruding operation to prevent separation of the free ends of the rotors.

2. A twin conical screw extruder according to claim 1, wherein each pressurizing means comprises a contact pressure adjusting member fixed to the free end of the conical screw rotor and a cap member removably capped on the contact pressure adjusting member.

* * * * *